US 9,541,908 B2

(12) United States Patent
Cho et al.

(10) Patent No.: US 9,541,908 B2
(45) Date of Patent: Jan. 10, 2017

(54) SERVO MOTOR CONTROLLER AND CONTROL METHOD THEREFOR (71) Applicants: SEOUL NATIONAL UNIVERSITY R&DB FOUNDATION, Seoul (KR); RS AUTOMATION CO., LTD., Pyeongtaek-si, Gyeonggi-do (KR)

(72) Inventors: Dong Il Cho, Seoul (KR); Wook Bahn, Seoul (KR); Sang Hoon Lee, Seongnam-si (KR)

(73) Assignees: SEOUL NATIONAL UNIVERSITY R&DB FOUNDATION, Seoul (KR); RS AUTOMATION CO., LTD., Gyeonggi-do (KR)

( * ) Notice: Subject to any disclaimer, the term of this patent is extended or adjusted under 35 U.S.C. 154(b) by 0 days.

(21) Appl. No.: 14/786,511

(22) PCT Filed: Apr. 22, 2014

(86) PCT No.: PCT/KR2014/003494
§ 371 (c)(1),
(2) Date: Oct. 22, 2015

(87) PCT Pub. No.: WO2014/175628
PCT Pub. Date: Oct. 30, 2014

(65) Prior Publication Data
US 2016/0077500 A1    Mar. 17, 2016

(30) Foreign Application Priority Data
Apr. 23, 2013 (KR) .................. 10-2013-0044763

(51) Int. Cl.
G05B 13/00      (2006.01)
G05B 13/02      (2006.01)
(Continued)

(52) U.S. Cl.
CPC ......... *G05B 13/0245* (2013.01); *G05B 13/045* (2013.01); *G05B 19/18* (2013.01); *H02P 23/0004* (2013.01); *H02P 29/027* (2013.01)

(58) Field of Classification Search
CPC .. H02P 23/0004; H02P 29/027; G05B 13/045; G05B 13/0245; G05B 19/18
(Continued)

(56) References Cited

U.S. PATENT DOCUMENTS 5,188,045 A * 2/1993 Fyler ................... D05B 35/102
                                                              112/306
5,818,651 A * 10/1998 Nomura ............... G11B 21/083
                                                              360/75

(Continued)

FOREIGN PATENT DOCUMENTS

JP      10-313592 A     11/1998
JP      2002-335685 A   11/2002
(Continued)

OTHER PUBLICATIONS

PCT International Search Report, PCT/KR2014/003494, Jul. 25, 2014, 4 Pages.

*Primary Examiner* — Eduardo Colon Santana
*Assistant Examiner* — Gabriel Agared
(74) *Attorney, Agent, or Firm* — Fenwick & West LLP (57) ABSTRACT

The present invention relates to a servo motor controller for controlling a servo motor having a current limiting unit, and a tuningless nonlinear control method thereof. According to the present invention, the servo motor controller control method for controlling a servo motor including a current limiting unit comprises the steps of: detecting that the limited current is output according to a current command of the current limiting unit; adjusting a disturbance estimation gain of the servo motor controller in response to the output of the limited current; and generating a control input pro- (Continued)

vided from the servo motor controller to the current limiting unit on the basis of the adjusted disturbance estimation gain.

11 Claims, 6 Drawing Sheets

(51) Int. Cl.
    *H02P 23/00*     (2016.01)
    *G05B 13/04*     (2006.01)
    *G05B 19/18*     (2006.01)
    *H02P 29/02*     (2016.01)

(58) Field of Classification Search
    USPC .......................................................... 318/561
    See application file for complete search history.

(56) References Cited

U.S. PATENT DOCUMENTS

| | | | | |
|---|---|---|---|---|
| 5,872,439 A * | 2/1999 | Nomura | ................ | G05B 13/04 318/632 |
| 6,211,636 B1 * | 4/2001 | Matsubara | .............. | B30B 15/14 318/432 |
| 6,876,168 B1 * | 4/2005 | Luo | ........................... | G05B 5/01 318/560 |
| 2002/0043949 A1 * | 4/2002 | Christison | ................ | G05B 5/01 318/560 |
| 2006/0113940 A1 * | 6/2006 | Nagai | .................... | B25J 9/1674 318/434 |
| 2006/0208683 A1 * | 9/2006 | Ide | ............................ | H02P 6/00 318/609 |
| 2009/0143871 A1 * | 6/2009 | Gao | ........................ | G05B 13/04 700/29 |
| 2010/0024233 A1 * | 2/2010 | Boland | .................. | B23Q 15/22 33/628 |
| 2011/0057595 A1 * | 3/2011 | Flanary | ................. | H02P 29/032 318/473 |

FOREIGN PATENT DOCUMENTS

| | | |
|---|---|---|
| KR | 10-1998-0020999 A | 6/1998 |
| KR | 10-2001-0001044 A | 1/2001 |
| KR | 10-2005-0065094 A | 6/2005 |

* cited by examiner

(a) Velocity command, velocity response, current command (b) ESTIMATED ERROR OF DISTURBANCE COMPENSATOR

Fig. 6

(a) Velocity command, velocity response, current command (b) ESTIMATED ERROR OF DISTURBANCE COMPENSATOR

SERVO MOTOR CONTROLLER AND CONTROL METHOD THEREFOR

TECHNICAL FIELD

This disclosure relates to a servo motor controller and a control method therefor, and more particularly, to a servo motor controller for controlling a servo motor having a current limiting unit and a tuningless nonlinear control method therefor.

BACKGROUND ART

In order to control a servo motor operating according to an input command, a PID control method which is a traditional control method is widely used. However, the PID control method is a linear control method, which is weak against nonlinearity of a model or occurrence of external disturbance, and the PID control method does not easily cope with the change of load in operation. For this reason, the PID control method has a drawback in that a tuning process should be performed separately for each situation. In order to overcome this drawback, various automatic tuning methods have been proposed, but these automatic tuning methods have insufficient performance in comparison to manual tuning methods.

Meanwhile, a variable structure control method which is a kind of nonlinear control ensures robustness within a range between an upper limit and a lower limit against to external disturbance such as change in parameters or load fluctuation, and is advantageously applied to a nonlinear in an easy way. Further, since an external disturbance compensator is used to decrease a value of a robustness coefficient, the chattering problem of the variable structure controller may be reduced. If this variable structure control method is applied, due to its robustness, a tuningless nonlinear controller requiring no user input may be implemented.

However, an external disturbance compensator of a general variable structure control method estimates external disturbance based on a predetermined model. For this reason, if an actual input is changed from the predetermined model (for example, an input current is limited), suitable external disturbance estimation may be failed, which greatly deteriorates the overall control performance.

DISCLOSURE

Technical Problem

This disclosure is directed to providing a servo motor controller, which may accurately control a servo motor even though an input current is limited, and a tuningless nonlinear control method therefor.

This disclosure is also directed to providing a servo motor controller to which a variable structure control method is applied, which may improve the overall control performance by preventing external disturbance estimation errors from being accumulated even at exceptional situations, for example when an input current exceeds an upper current limit, and a tuningless nonlinear control method therefore.

Technical Solution

In one general aspect, there is provided a control method for a servo motor controller which controls a servo motor having a current limiting unit, the control method comprising: detecting an output of a limited current as a current command of the current limiting unit; adjusting an estimated disturbance gain of the servo motor controller as a response to the output of the limited current; and generating a control input provided from the servo motor controller to the current limiting unit, based on the adjusted estimated disturbance gain.

In an embodiment, the servo motor controller may include: an external disturbance compensator configured to calculate an estimated disturbance value, based on the estimated disturbance gain and a switching function which is a function for an error between position and velocity commands input from the outside and position and velocity of the servo motor; and a variable structure controller configured to generate the control input, based on the switching function and the estimated disturbance value.

In an embodiment, the servo motor controller may further include a variable estimated disturbance gain adjuster configured to adjust the estimated disturbance gain of the servo motor controller, as a response to the output of the limited current, and when the limited current is not output, the variable estimated disturbance gain adjuster may adjust the estimated disturbance gain so that the estimated disturbance gain has a first value, but when the limited current is output, the variable estimated disturbance gain adjuster may adjust the estimated disturbance gain so that the estimated disturbance gain has a second value different from the first value.

In an embodiment, the second value may be 0.

In an embodiment, the external disturbance compensator may multiply the estimated variation calculated based on the switching function by the estimated disturbance gain, and integrate the multiplied results to calculate the estimated disturbance value.

In an embodiment, the external disturbance compensator may iteratively calculate the estimated disturbance value at every control cycle of the servo motor controller.

In an embodiment, when the limited current is output from the current limiting unit, the estimated disturbance value may have the same value as an estimated disturbance value of a previous control cycle.

In an embodiment, the position and velocity of the servo motor may be provided to the servo motor controller as a feedback for the control result of the servo motor.

In an embodiment, the limited current may be a current command designating a decreased current smaller than the control input, as a current command designating a maximum current allowable by the servo motor.

In another aspect of the present disclosure, there is also provided a servo motor controller for controlling a servo motor having a current limiting unit, wherein the servo motor controller provides a control input to the current limiting unit to control an operation of the servo motor, wherein the servo motor controller adjusts an estimated disturbance gain of the servo motor controller as a response to the limited current output from the current limiting unit to the load, and wherein the servo motor controller generates the control input provided to the current limiting unit, based on the adjusted estimated disturbance gain.

In an embodiment, the limited current may be a current command designating a decreased current smaller than the control input, as a current command designating a maximum current allowable by the servo motor.

In an embodiment, when the limited current is not output, the servo motor controller may adjust the estimated disturbance gain so that the estimated disturbance gain has a first value, and when the limited current is output, the servo motor controller may adjust the estimated disturbance gain so that the estimated disturbance gain has a second value smaller than the first value.

In an embodiment, the second value may be 0.

In an embodiment, the servo motor controller may multiply the estimated variation calculated according to a predetermined equation by the estimated disturbance gain, and integrate the multiplied results to generate the control input according to the calculated estimated disturbance value.

Advantageous Effects

According to embodiments of the present disclosure, since an estimated gain of an external disturbance compensator is adjusted in a situation where an input current is limited, it is possible to reduce an error of the external disturbance compensator and improve control performance of the servo motor controller.

In addition, since a servo motor is controlled by applying a variable structure control method and an external disturbance compensator, it is possible to perform tuningless nonlinear control requiring no user input.

BEST MODE

The following detailed description of the present disclosure refers to the accompanying drawings which show specific embodiments implemented by the present disclosure. These embodiments are described in detail so as to be easily implemented by those skilled in the art. It should be understood that various embodiments of the present disclosure are different from each other but not exclusive from each other.

For example, specific shapes, structures and features written herein can be implemented in other embodiments without departing from the scope of the present disclosure. In addition, it should be understood that locations or arrangements of individual components in each embodiment may be changed without departing from the scope of the present disclosure. Therefore, the following detailed description is not directed to limiting the present disclosure, and the scope of the present disclosure is defined just with the appended claims along and their equivalents, if it is suitably explained.

Meanwhile, in the drawings, like reference numerals denote like elements through several drawings. The shape, size and regions, and the like, of the drawing may be exaggerated for clarity and may not be equal or similar to actual dimensions.

Figure 1:
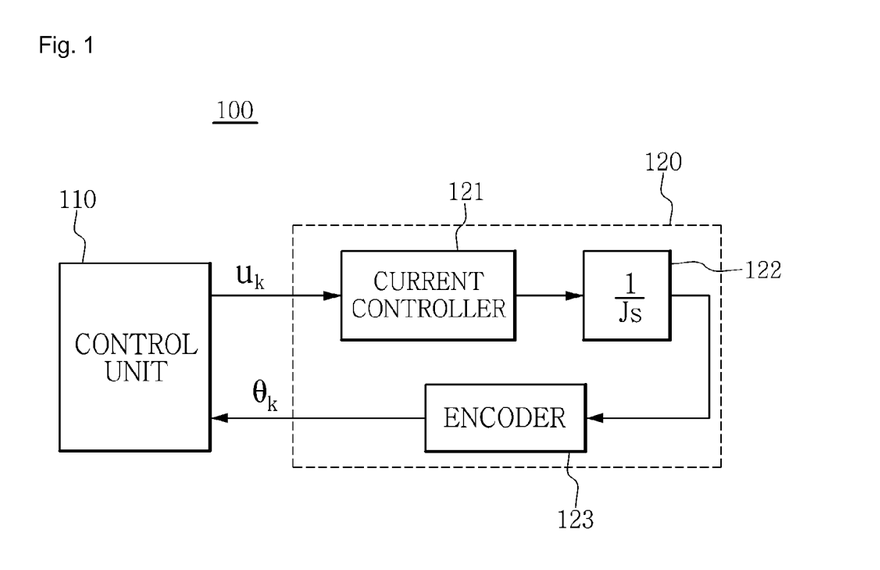
FIG. 1 is a block diagram schematically showing a servo motor controller according to an embodiment of the present disclosure.

FIG. 1 is a block diagram schematically showing a servo motor controller according to an embodiment of the present disclosure. Referring to FIG. 1, the servo motor 100 includes a servo motor control unit 110 and a load 120.

The control unit 110 generates a control input uk for controlling a servo motor.

The control input uk generated by the control unit 110 is transferred to the load 120.

The load 120 includes a current controller 121, a motor 122 (or, a load) and an encoder 123. First, a control input uk is transferred from the control unit 110 to the current controller 121, and then the current controller 121 provides a drive current corresponding to the control input uk to the motor 122 (or, the load). In addition, the encoder 123 encodes, for example, a parameter of the operating motor 122 and provides its angular displacement θk to the control unit 110 as a feedback. When controlling the servo motor, the control unit 110 refers to the received feedback.

Meanwhile, even though it is illustrated as an example that the fed-back signal is an angular displacement, the present disclosure is not limited thereto. For example, the fed-back signal may include a velocity of the motor instead of or in addition to the angular displacement.

Detailed configurations and operations of the current controller 121, the motor 122 and the encoder 123 are already known in the art and thus not described in detail here.

Figure 2:
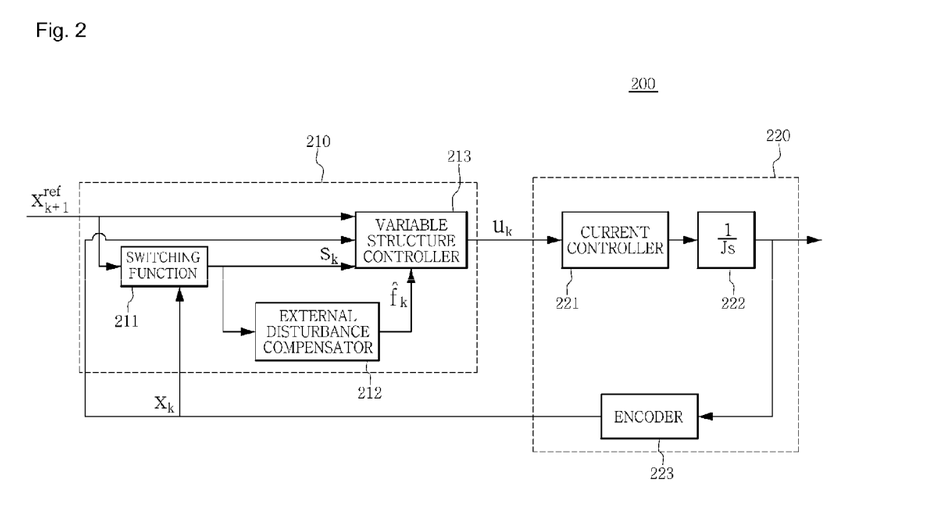
FIG. 2 is a block diagram schematically showing a servo motor controller including a variable structure controller and an external disturbance compensator, as an example of the servo motor controller of FIG. 1.

FIG. 2 is a block diagram schematically showing a servo motor controller including a variable structure controller and an external disturbance compensator, as an example of the servo motor controller described above. Referring to FIG. 2, the servo motor 200 includes a servo motor control unit 210 and a load 220.

In the embodiment of FIG. 2, the control unit 210 may include a switching function 211, an external disturbance compensator 212 and a variable structure controller 213. even though FIG. 2 illustrates as an example that the switching function 211, the external disturbance compensator 212 and the variable structure controller 213 are independent components, the present disclosure is not limited thereto. For example, the switching function 211, the external disturbance compensator 212 and the variable structure controller 213 may be software implemented in a single process but functionally distinguished from each other.

In the embodiment of FIG. 2, the control unit 210 and the load 220 operates substantially similar to the control unit 110 and the load 120 of FIG. 1. However, in the embodiment of FIG. 2, it is illustrated that a fed-back signal Xk includes a position (or, an angular displacement) and a velocity of the motor 222.

In the present disclosure, the control unit 210, the switching function 211, the external disturbance compensator 212 and the variable structure controller 213 are designed to conform to a mathematical modeling expressed by the following equations. In the mathematical modeling of the present disclosure, a discrete time state space equation is defined as in Equation 1 below.

$$x_{k+1} = \Phi x_k + \Gamma u_k \quad \text{Equation 1}$$

Here, $x_k \in R^{n \times 1}$ represents a state variable, and $u_k \in R^1$ represents an input. In consideration of parametric uncertainties and external disturbance, the state space equation of Equation 1 is defined again as in Equation 2 below.

$$x_{k+1} = (\Phi + \Delta\Phi)x_k + (\Gamma + \Delta\Gamma)u_k + d_k \quad \text{Equation 2}$$

Here, $d_k \in R^{n \times 1}$ represents an external disturbance, and $\Delta\phi$ and $\Delta\Gamma$ represent parametric uncertainties.

The generalized disturbance is defined as in Equation 3 below.

$$f_k = \bar{a}x_k + \bar{b}u_k + \bar{d}_k \quad \text{Equation 3}$$

Here, $\bar{a} \in R^{1 \times n}$, $\bar{b} \in R^1$, $\bar{d}_k \in R^1$ respectively satisfy Equation 4, Equation 5, and Equation 6 below.

$$\Delta\Phi = \Gamma\bar{a} \quad \text{Equation 4}$$

$$\Delta\Gamma = \Gamma\bar{b} \quad \text{Equation 5}$$

$$d_k = \Gamma\bar{d}_k \quad \text{Equation 6}$$

If Equation 2 is applied to Equation 3, Equation 7 below is derived as a result.

$$x_{k+1} = \Phi x_k + \Gamma u_k + \Gamma f_k \quad \text{Equation 7}$$

Meanwhile, regarding the servo motor, at this time, the state variable xk is defined as in Equation 8 below.

$$x_k = [\theta_k \omega_k]^T \quad \text{Equation 8}$$

Here, θk represents a rotation angle of the servo motor, and ωk represents a rotating angular velocity of the servo motor.

At this time, the reference command $x_x^{ref}$ is defined as in Equation 9 below in the same form as the state variable.

$$x_x^{ref} = [\theta_k^{ref} \omega_k^{ref}]^T \quad \text{Equation 9}$$

Here, $\theta_k^{ref}$ represents a rotation angle command for the servo motor, and $\omega_k^{ref}$ represents a rotating angular velocity command for the servo motor.

As a difference between Equation 8 and Equation 9, an error function as in Equation 10 below is defined.

$$e_k = x_k - x_k^{ref} \quad \text{Equation 10}$$

In addition, as a relation function with the error function ek, a switching function as in Equation 11 below is defined.

$$s_k = Ge_k \quad \text{Equation 11}$$

In addition, for the state space equation of Equation 7, a control input uk of the variable structure controller 213 for making the switching function Sk into 0 and a generalized estimated disturbance value $\hat{f}_k$ estimated by the external disturbance compensator 212 are respectively defined as Equation 12 and Equation 13. It has been already proved in the art that a variable structure controller having Equation 12 as a control input makes the switching function into 0 at a sliding surface. Therefore, this will not be described in detail here.

$$u_k = -\hat{f}_k + (G\Gamma)^{-1}\left[-G\Phi x_k + Gx_{k+1}^{ref} + qs_k - \eta sat\left(\frac{s_k}{\phi}\right)\right] \quad \text{Equation 12}$$

$$\hat{f}_{k+1} = \hat{f}_k + (G\Gamma)^{-1}g\left[s_k - qs_{k-1} + \eta sat\left(\frac{s_{k-1}}{\phi}\right)\right] \quad \text{Equation 13}$$

At this time, in the second term at the right side of Equation 13, a value excluding g (namely, $$(G\Gamma)^{-1}\left[s_k - qs_{k-1} + \eta sat\left(\frac{s_{k-1}}{\phi}\right)\right])$$

means an estimated variation obtained by estimating a variation of the external disturbance.

If the estimated disturbance error dynamics is calculated according to Equation 13, Equation 14 is obtained as a result.

$$\hat{f}_{k+1} = (1-g)\tilde{f}_k + f_{k+1} - f_k \quad \text{Equation 14}$$

Here, $\tilde{f}_k = f_k - \hat{f}_k$ means a difference between the estimated external disturbance and the actual external disturbance.

Referring to Equation 14, in case of |1−g|<1, if $|f_{k+1} - f_k| < M$ is satisfied for any positive constant M and all of k, it may be obviously proved that k0 satisfying $|\tilde{f}_k| < M/g$ must exist regardless of $|\tilde{f}_0|$.

The control unit 210 that includes the switching function 211, the external disturbance compensator 212 and the variable structure controller 213 is mathematically modeled according to Equations 1 to 14 as described above, and then the control unit 210 generates a control input uk as in Equation 12 and transfers the control input to the load 220.

The load 220 includes a current controller 221, a motor 222 and an encoder 223. The current controller 221, the motor 222 and the encoder 223 of FIG. 2 have substantially the same configurations and operations as the current controller 121, the motor 122 and the encoder 123 of FIG. 1.

Figure 3:
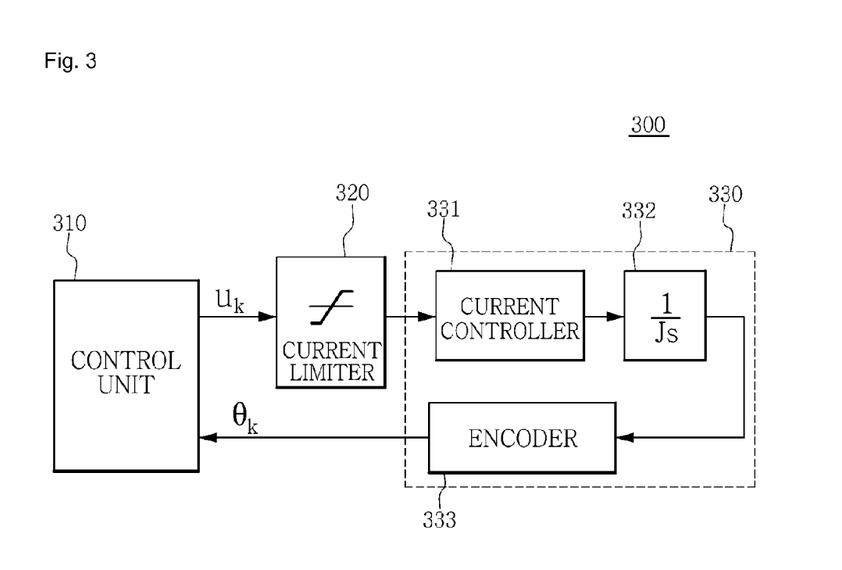
FIG. 3 is a block diagram schematically showing a servo motor controller including a current limiting unit according to an embodiment of the present disclosure.

FIG. 3 is a block diagram schematically showing a servo motor controller that includes a current limiting unit according to an embodiment of the present disclosure. Referring to FIG. 3, the servo motor 300 includes a servo motor controller 310, a current limiting unit 320 (or, a current limiter) and a load 330.

In FIG. 3, the control input uk generated by the control unit 310 is transferred to the load 330 via the current limiting unit 320. In addition, the load 330 (in more detail, the encoder 333) transfers an encoded parameter of the motor 332 to the control unit 310 as a feedback (for example, in FIG. 3, an angular displacement θk is transferred as a feedback). However, this is just an example, and the present disclosure is not limited thereto. For example, the fed-back signal may include a velocity of the motor instead of or in addition to the angular displacement.

The control unit 310 generates a control input uk. Mathematical modeling or operations of the control unit 310 are similar to those of the control unit 210 illustrated in FIG. 2. However, though being fully described later, the control unit 310 different from the control unit 210 of FIG. 2 in that point further adopting an element for varying an estimated error gain (for example, g of Equation 13) of the external disturbance compensator.

The load 330 includes a current controller 331, a motor 332 and an encoder 333. Detailed configurations and operations of the load 330 are substantially identical to those of the loads 120, 220 of FIGS. 1 and 2.

The current limiting unit 320 restricts a maximum current applied to the load 330. Generally, the servo motor 300 includes a current limiting unit 320 for preventing a current from increasing over an allowable current at the instant of being input to the motor 332.

Even though the control input uk (or, a current level designated by the control input) provided from the control unit 310 exceeds the allowable current, the current limiting unit 320 controls the current controller 331 so that only a restricted current not exceeding the allowable current is transferred to the motor 332. Specifically, a current command decreased current lower than the control input by the current limiting unit 320 (hereinafter, referred to as a limited current) is transferred to the current controller 331. Therefore, there is a difference between an estimated output of the motor calculated by mathematical modeling (illustrated in FIG. 2) and an actual output of the motor. This difference is accumulated (or, integrated) to the estimated disturbance value of the external disturbance compensator (for example, 212 of FIG. 2), which may cause a great overshoot when controlling the servo motor and delay the overall response time.

The present disclosure, in a situation where a current limit is existing, proposes the method for preventing the estimated disturbance value of the external disturbance compensator from inappropriately increasing by detecting the current limit and adjusting the estimated error gain of the external disturbance compensator (for example, into 0).

In the present disclosure, the variable estimated error gain adjustable due to the current limit is defined as in Equation 15 below.

$$g = \begin{cases} g_{normal} & \text{if } abs(u_k) < i_{lim}, \\ 0 & \text{if } abs(u_k) > i_{lim} \end{cases} \quad \text{Equation 15}$$

Here, ilim represents an allowable current of the current limiting unit 320.

The control unit 310 of FIG. 3 applies the variable estimated error gain (for example, that of Equation 15), to prevent the estimated disturbance value of the external disturbance compensator from excessively increasing in a situation of a current limit and to control the estimated disturbance value to suitably conform to the actual output of the motor 332.

The servo motor controller to which the variable estimated error gain is applied and its control method will be described in more detail below with reference to FIG. 4.

Figure 4:
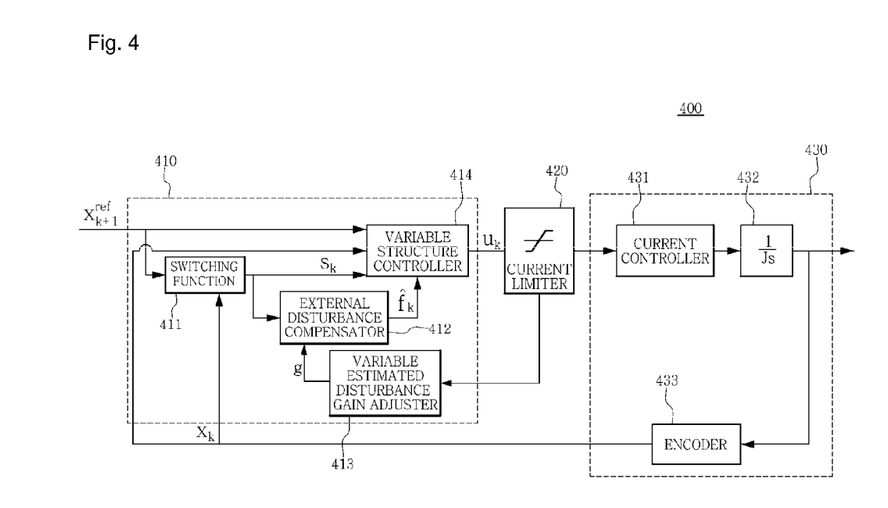
FIG. 4 is a block diagram schematically showing a servo motor controller including a variable estimated disturbance gain adjuster for adjusting a gain of an external disturbance compensator according to a current limit situation, as an example of the servo motor controller of FIG. 3.
Figure 5:
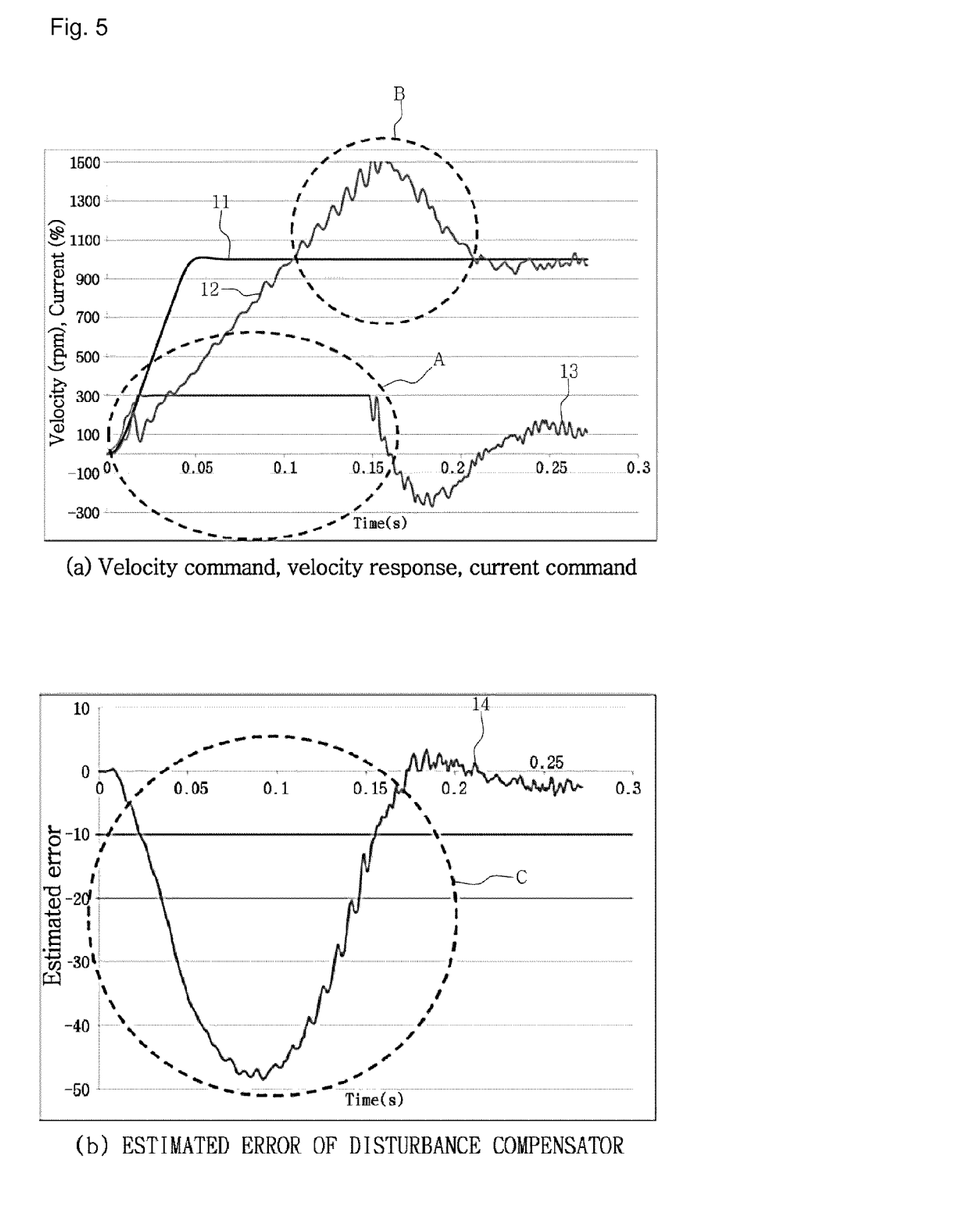
FIGS. 5 and 6 are diagrams for comparatively illustrating effects obtained by applying a variable estimated disturbance gain.

FIG. 4 is a block diagram schematically showing a servo motor controller including a variable estimated disturbance gain adjuster for adjusting a gain of an external disturbance compensator according to a current limit situation, as an example of the servo motor controller having the current limiting unit. Referring to FIG. 4, the servo motor 400 includes a servo motor control unit 410, a current limiting unit 420 and a load 430.

Detailed configurations of the current limiting unit 420 and the load 430 are identical to those illustrated in FIG. 3. Therefore, they are not described in detail here. However, the fed-back signal Xk is illustrated as including a position (or, an angular displacement) and a velocity of a motor 432.

The control unit 410 includes a switching function 411, an external disturbance compensator 412, a variable estimated disturbance gain adjuster 413 and a variable structure controller 414.

The switching function 411 is a function for an error between position and velocity commands ($X_{k+1}^{ref}$) input from the outside and position and velocity commands Xk fed back from the encoder 433.

The external disturbance compensator 412 calculates an estimated disturbance value by using the defined switching function 411. At this time, the external disturbance compensator 412 multiplies a variation of the estimated external disturbance obtained by a relation function with the switching function 411 by the variable estimated disturbance gain, at every control cycle of the control unit 410, and accumulates them to calculate an estimated disturbance value (for example, according to the method expressed in Equation 13).

The variable structure controller 414 generates a control input uk for making the value of the switching function 411 into 0.

The variable estimated disturbance gain adjuster 413 compares the allowable current value determined by the current limiting unit 420 (namely, an upper current limit restricted by the current limiting unit) and the generated control input uk. The variable estimated disturbance gain adjuster 413 adjusts the variable estimated disturbance gain of the external disturbance compensator 412 according to whether the control input uk exceeds the allowable current.

Hereinafter, a method for adjusting a variable estimated disturbance gain according to the present disclosure will be described in more detail.

For the servo motor, the discrete time system matrix and the input gain of Equation 7 may be modeled into Equation 16 and Equation 17 below.

$$\Phi = \begin{bmatrix} 1 & T \\ 0 & 1 \end{bmatrix} \quad \text{Equation 16}$$

Here, T represents a sampling time of a discrete time model.

$$\Gamma = \begin{bmatrix} 0 \\ \dfrac{K_\tau}{J} T \end{bmatrix} \quad \text{Equation 17}$$

Here, Kτ represents a torque constant of the servo motor, and J represents inertia moment of a rotor and a load.

When a current limit occurs (for example, when the control input uk exceeds the allowable current of the current limiting unit 420), in Equation 2, a difference between the mathematical model and the actual motor output may be expressed as in Equation 18 below.

$$\Delta \Gamma = \begin{bmatrix} 0 \\ \Delta I \end{bmatrix} \quad \text{Equation 18}$$

Here, ΔI represents a difference between the control input and the allowable current, and ΔI=uk−ilim.

In addition, if Equation 5 is arranged with respect to $\bar{b}$ by using Equation 17 and Equation 18, Equation 19 below is obtained as a result.

$$\bar{b} = -\dfrac{\Delta I}{\dfrac{K_p K_r}{J} T} \quad \text{Equation 19}$$

Subsequently, if Equation 19 is applied to Equation 7, the generalized disturbance generated by the current limit is calculated as in Equation 20 below.

$$f_k = -\dfrac{\Delta I}{\dfrac{K_p K_r}{J} T} u_k \quad \text{Equation 20}$$

At this time, referring to Equation 15, in a situation of a current limit, the variable estimated disturbance gain g is 0, and thus in Equation 13, the estimated disturbance value is not updated but satisfy Equation 21 below.

$$\hat{f}_k = \hat{f}_0 = \text{constant} \quad \text{Equation 21}$$

Therefore, the estimated disturbance error $\tilde{f}_k$ when a current limit occurs becomes Equation 22 below.

$$\tilde{f}_k = f_k - \hat{f}_k = -\frac{\Delta I}{\frac{K_p K_r}{J}T} u_k - \hat{f}_0 \qquad \text{Equation 22}$$

When a current limit does not occur, the estimated external disturbance error dynamics of Equation 14 is applied, and thus if the control input is lower than the allowable current, the estimated disturbance error by the current limit expressed in Equation 22 is converged to a value below a certain level.

Meanwhile, in order to control the servo motor, it is obvious that the control input should be lowered below the allowable current. Therefore, even though the feature of the present disclosure of adjusting a variable estimated disturbance gain is applied to a servo motor controller, no serious problem is caused in system stability.

FIGS. 5(a) and 5(b) and 6(a) and 6(b) are diagrams for comparatively illustrating effects obtained by applying a variable estimated disturbance gain.

FIGS. 5(a) and 5(b) shows a simulation result of an operation of the servo motor when a variable estimated disturbance gain is not applied.

FIG. 5(a) is a two-dimensional graph with regard to time and velocity, which shows a velocity command (11, $X_{k+1}^{ref}$) input to the servo motor controller, the current command 12 output from the current limiting unit, and a velocity response 13 (Xk) (or, a velocity feedback) of the servo motor.

FIG. 5(b) is a two-dimensional graph with regard to time and velocity, showing the estimated error 14 which is an estimated disturbance value ($\hat{f}_k$) estimated by the external disturbance compensator of the servo motor controller.

Referring to FIGS. 5(a) and 5(b), as the velocity command 11 increases, the current command 12 reaches the allowable limit (about 300%), and the estimated error 14 continuously increases. In particular, in a limit region A where the current command 12 reaches the allowable limit, the estimated error 14 is much greater than the actual external disturbance (see the region C of FIG. 5(b)), and accordingly the velocity of the servo motor expressed as the velocity response 13 exhibits a great overshoot B.

In addition, since the time when the estimated error 14 keeps a great value is elongated, the limit region A of the current command 12 also extends (in a severe case, the current command 12 keeps the allowable limit even in a region where the velocity response 13 is between 0.1 second and 0.15 second, which exceeds the velocity command 11). As a result, the entire control time for the servo motor is also elongated.

On the contrary, FIGS. 6(a) and 6(b) shows simulation results of the operation of the servo motor in a state where the variable estimated disturbance gain is applied.

FIG. 6(a) is a two-dimensional graph with regard to time and velocity, which shows a velocity command 21 ($X_{k+1}^{ref}$) input to the servo motor controller to which the variable estimated disturbance gain is applied, a current command 22 output by the current limiting unit, and a velocity response 23 (Xk) of the servo motor.

FIG. 6(b) is a two-dimensional graph with regard to time and velocity, showing an estimated disturbance value 24 ($\hat{f}_k$) estimated by the external disturbance compensator of the servo motor controller to which the variable estimated disturbance gain is applied.

Referring to FIGS. 6(a) and 6(b), as the velocity command 21 increases, the current command 22 reaches the allowable limit (about 300%), and the current command 22 does not increase over the allowable limit.

Figure 6:
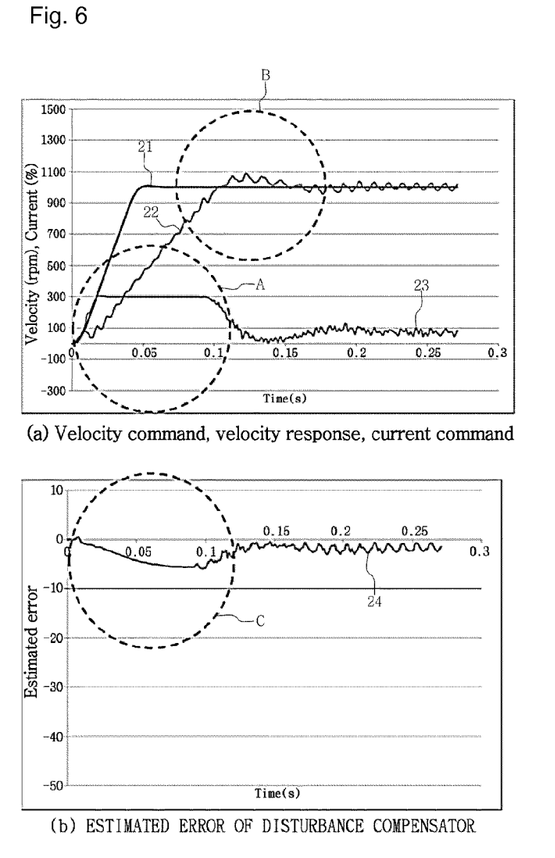

However, since the variable estimated disturbance gain is applied in FIG. 6, in a limit region A where the current command 22 reaches the allowable limit, the estimated disturbance gain g becomes a variable (for example, 0). Accordingly, the estimated disturbance value 24 is much lower than the case of FIG. 5 (see the region C of FIG. 6(b)), and thus the velocity of the servo motor expressed as the velocity response 23 exhibits only relatively much smaller overshoot B.

In addition, since it is prevented that the estimated error 24 inappropriately increases in the limit region A, the limit region A of the current command 22 is relatively shortened. Referring to FIG. 6(a), it may be found that the limit region A is instantly terminated near a time of 0.1 second when the velocity response 23 is substantially coincided with the velocity command 21.

Therefore, since the overshoot decreases and the limit region of the current command 22 is suitably controlled, the control time or response time of the servo motor is shortened as a whole.

While detailed embodiments have been explained in the detailed description of the present disclosure, each embodiment may be modified in various ways without departing from the scope of the present disclosure.

In addition, even though specific terms have been used herein, they are just for illustrating the present disclosure and are not intended to limit the meaning or scope of the present disclosure defined in the appended claims. Therefore, the scope of the present disclosure is not limited to the above embodiments but should be defined based on the appended claims.

The invention claimed is:

1. A control method for a servo motor controller which controls a servo motor having a current limiting unit, the control method comprising:
   detecting an output of a limited current as a current command of the current limiting unit;
   adjusting an estimated disturbance gain of the servo motor controller as a response to the output of the limited current; and
   generating a control input provided from the servo motor controller to the current limiting unit, based on the adjusted estimated disturbance gain,
   wherein the servo motor controller includes:
   an external disturbance compensator configured to calculate an estimated disturbance value, based on the estimated disturbance gain and a switching function which is a function for an error between position and velocity commands input from the outside and position and velocity of the servo motor; and
   a variable structure controller configured to generate the control input, based on the switching function and the estimated disturbance value.

2. The control method for a servo motor controller according to claim 1, wherein the servo motor controller further includes:
   a variable estimated disturbance gain adjuster configured to adjust the estimated disturbance gain of the servo motor controller, as a response to the output of the limited current,
   wherein when the limited current is not output, the variable estimated disturbance gain adjuster adjusts the estimated disturbance gain so that the estimated disturbance gain has a first value, and when the limited current is output, the variable estimated disturbance gain adjuster adjusts the estimated disturbance gain so that the estimated disturbance gain has a second value different from the first value.

3. The control method for a servo motor controller according to claim 2, wherein the second value is 0.

4. The control method for a servo motor controller according to claim 1,
wherein the external disturbance compensator multiplies the estimated variation calculated based on the switching function by the estimated disturbance gain, and integrates the multiplied results to calculate the estimated disturbance value.

5. The control method for a servo motor controller according to claim 4,
wherein the external disturbance compensator iteratively calculates the estimated disturbance value at every control cycle of the servo motor controller.

6. The control method for a servo motor controller according to claim 5,
wherein when the limited current is output from the current limiting unit, the estimated disturbance value has the same value as an estimated disturbance value of a previous control cycle.

7. The control method for a servo motor controller according to claim 1,
wherein the position and velocity of the servo motor are provided to the servo motor controller as a feedback for the control result of the servo motor.

8. The control method for a servo motor controller according to claim 1,
wherein the limited current is a current command designating a maximum current allowable by the servo motor.

9. A servo motor controller for controlling a servo motor having a current limiting unit,
wherein the servo motor controller provides a control input to the current limiting unit to control an operation of the servo motor,
wherein the servo motor controller adjusts an estimated disturbance gain of the servo motor controller as a response to the limited current output from the current limiting unit to the load, and
wherein the servo motor controller generates the control input provided to the current limiting unit, based on the adjusted estimated disturbance gain,
wherein the limited current is a current command designating a maximum current allowable by the servo motor,
wherein when the limited current is not output, the servo motor controller adjusts the estimated disturbance gain so that the estimated disturbance gain has a first value, and when the limited current is output, the servo motor controller adjusts the estimated disturbance gain so that the estimated disturbance gain has a second value smaller than the first value.

10. The servo motor controller according to claim 9, wherein the second value is 0.

11. The servo motor controller according to claim 9,
wherein the servo motor controller multiplies the estimated variation calculated according to a predetermined equation by the estimated disturbance gain, and integrates the multiplied results to generate the control input according to the calculated estimated disturbance value.

* * * * *